United States Patent
Denari et al.

Patent Number: 6,164,065
Date of Patent: Dec. 26, 2000

[54] AFTER TREATMENT SYSTEM FOR A VARIABLE DISPLACEMENT ENGINE

[75] Inventors: John Denari, Dearborn; Jeffrey Scott Hepburn, Birmingham, both of Mich.

[73] Assignee: Ford Global Technologies, Inc., Dearborn, Mich.

[21] Appl. No.: 09/439,277

[22] Filed: Nov. 12, 1999

[51] Int. Cl.[7] .................................................. F01N 3/00
[52] U.S. Cl. ............................. 60/284; 60/284; 60/297; 60/292; 60/296; 60/324
[58] Field of Search ............................ 60/284, 295, 296, 60/287, 288, 289, 292, 324, 274, 299

[56] References Cited

U.S. PATENT DOCUMENTS

| | | |
|---|---|---|
| 5,125,231 | 6/1992 | Patil . |
| 5,233,831 | 8/1993 | Hitomi et al. ............................. 60/284 |
| 5,307,627 | 5/1994 | Christensen . |
| 5,398,503 | 3/1995 | Danno . |
| 5,406,790 | 4/1995 | Hirota et al. ............................. 60/276 |
| 5,457,958 | 10/1995 | Boegner et al. .......................... 60/279 |
| 5,499,501 | 3/1996 | Kato . |
| 5,560,201 | 10/1996 | Fujishita . |
| 5,603,216 | 2/1997 | Guile . |
| 5,634,332 | 6/1997 | Tanaka . |
| 5,647,206 | 7/1997 | Yamamoto . |
| 5,655,362 | 8/1997 | Kawajiri . |
| 5,701,735 | 12/1997 | Kawaguchi ............................. 60/274 |
| 5,738,832 | 4/1998 | Dogahara . |
| 5,800,793 | 9/1998 | Cole . |
| 6,023,929 | 2/2000 | Ma ........................................... 60/295 |
| 6,082,100 | 7/2000 | Boegner et al. ......................... 60/278 |

Primary Examiner—Thomas Denion
Assistant Examiner—Binh Tran
Attorney, Agent, or Firm—Jerome R. Drouillard

[57] ABSTRACT

A method (100) and system (10) for controlling the temperature of a first $NO_x$ trap in an aftertreatment system for a variable displacement engine (12). The frequency of switching between first and second cylinder banks (14, 16) of said variable displacement engine (12) controls the temperature of the $NO_x$ trap (18) in order to maintain the temperature within a preferred operating temperature range. A set of control valves (V1, V2, V3) is used to direct the flow of exhaust from alternate cylinder banks (14, 16) through various paths in order to maintain the desired temperature of the first $NO_x$ trap (18). In another embodiment (30), the aftertreatment and method (120) include a second $NO_x$ trap (26) for situations in which both engine banks (14, 16) are run simultaneously.

7 Claims, 2 Drawing Sheets

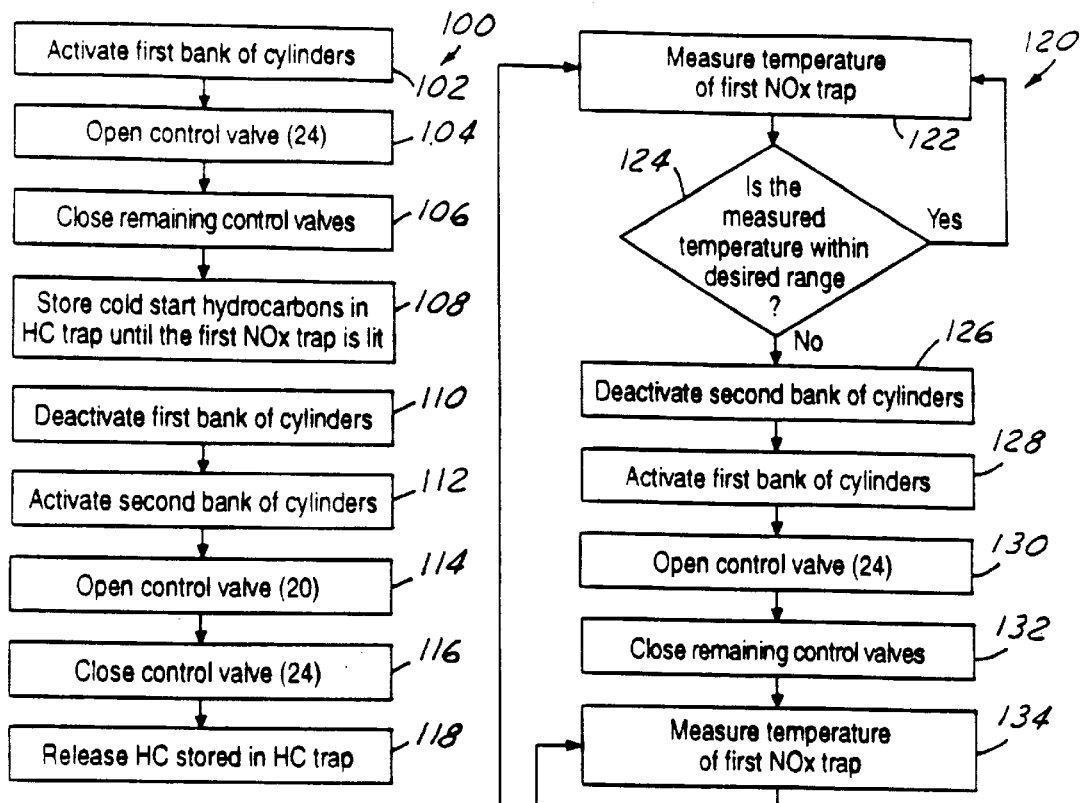
FIG.3
FIG.4
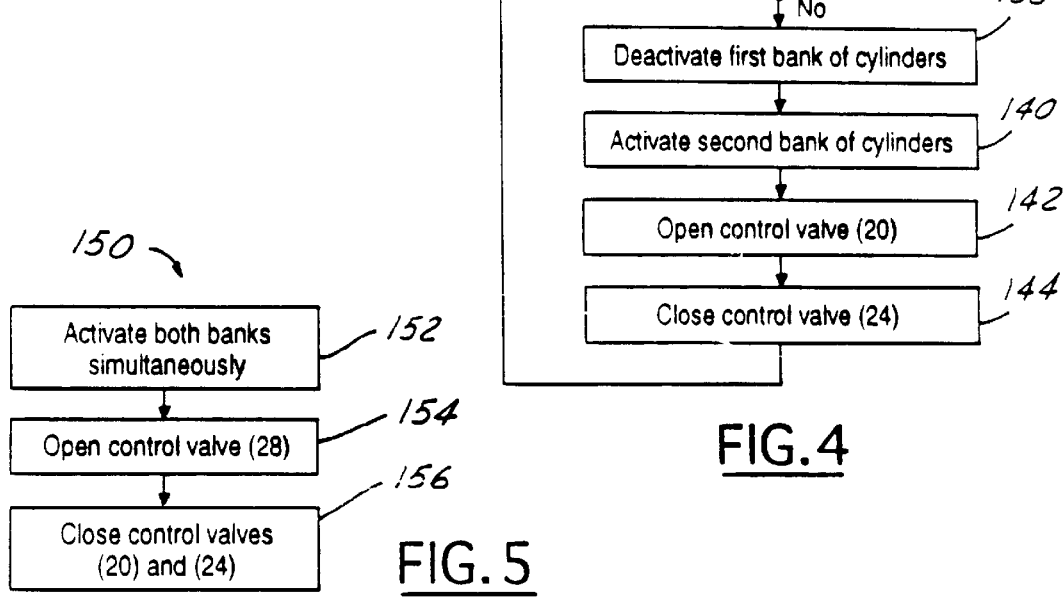
FIG.5

AFTER TREATMENT SYSTEM FOR A VARIABLE DISPLACEMENT ENGINE

FIELD OF THE INVENTION

The present invention relates generally to variable displacement engines, and more particularly to an aftertreatment system for a V-type variable displacement engine.

BACKGROUND OF THE INVENTION

Precious metal three-way catalysts are generally used as a means for removing pollutants from the exhaust gas of an internal combustion engine. These three-way catalysts remove CO, HC, and $NO_x$ simultaneously from engine exhaust gases under stoichiometric conditions. However, under lean fuel conditions, which are desired for optimal fuel efficiency, the three-way catalyst is ineffective for the removal of $NO_x$. Accordingly, to achieve $NO_x$ control fuel lean conditions, exhaust after-treatment systems have included a lean $NO_x$ trap (LNT). Presently, however, the performance of $NO_x$ trap technology is limited in several respects. $NO_x$ trap performance is affected by the operating temperature and requires a relatively narrow temperature-operating window. At temperatures outside this window, the device may not operate efficiently and $NO_x$ emissions can increase.

Both three-way catalysts and lean $NO_x$ traps (LNT) are generally inefficient at ambient temperatures and must reach high temperatures before they are activated. Typically, contact with high-temperature exhaust gases from the engine elevates the temperature of the catalyst or LNT. The temperature at which a catalytic converter can convert 50% of CO, HC, or $NO_x$ is referred to as the "light-off" temperature of the converter.

During start up of the engine, the amount of CO and HC in the exhaust gas is higher than during normal engine operation. While a large portion of the total emissions generated by the engine are generated within the first few minutes after start up, the catalysts are relatively ineffective because they will not have reached the "light-off" temperature. In other words, the catalysts are the least effective during the time they are needed the most.

A reduction in harmful emissions is a constant concern for the environment. Another concern is increased fuel efficiency. It is possible to save fuel by operating in a fuel lean A/F mode and/or on less than all cylinders during certain operating conditions. The variable displacement engine has a controller that disables selected cylinders in the engine, causing the engine to have a decreased effective displacement, through control of a plurality of engine cylinder valve deactivators.

SUMMARY OF THE INVENTION

It is an object of the present invention to actively enhance engine performance and improve fuel economy and emissions. It is another object of the present invention to provide an aftertreatment and control strategy for a variable displacement engine.

It is a further object of the present invention to provide a control strategy that uses a $NO_x$ trap for lean burn operation in conjunction with a catalyzed HC trap for cold start HC emission control.

The foregoing and other objects and advantages are achieved through controlling predetermined cylinder banks of a variable displacement engine during engine start up and during various engine operating conditions to manipulate storage and oxidation of hydrocarbons. As the engine operation switches between the two cylinder banks, the $NO_x$ trap operates as a reverse flow reactor. Controlling the rate, or frequency, of switching between two cylinder banks controls the operating temperature of the $NO_x$ trap.

One advantage of the present invention is that it reduces emissions and improves $NO_x$ trap thermal management during lean burn operation and engine cold start. Other features and advantages of the present invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention. In the drawings:

FIG. 3 is a flow chart of the method of the present invention at engine start up;

FIG. 4 is a flow chart of the method of the present invention during typical operating conditions; and FIG. 5 is a flow chart of the method of the present invention while both cylinder banks are running simultaneously.

DESCRIPTION OF THE PREFERRED EMBODIMENT(S)

The present invention provides an aftertreatment system and control strategy for a variable displacement engine. Based upon principles of reverse flow reactor theory, the $NO_x$ trap operates as a reverse flow reactor and the rate, or frequency, of switching between two cylinder banks of a variable displacement engine controls the operating temperature of the $NO_x$ trap enabling maximum trap efficiency.

Figure 1:
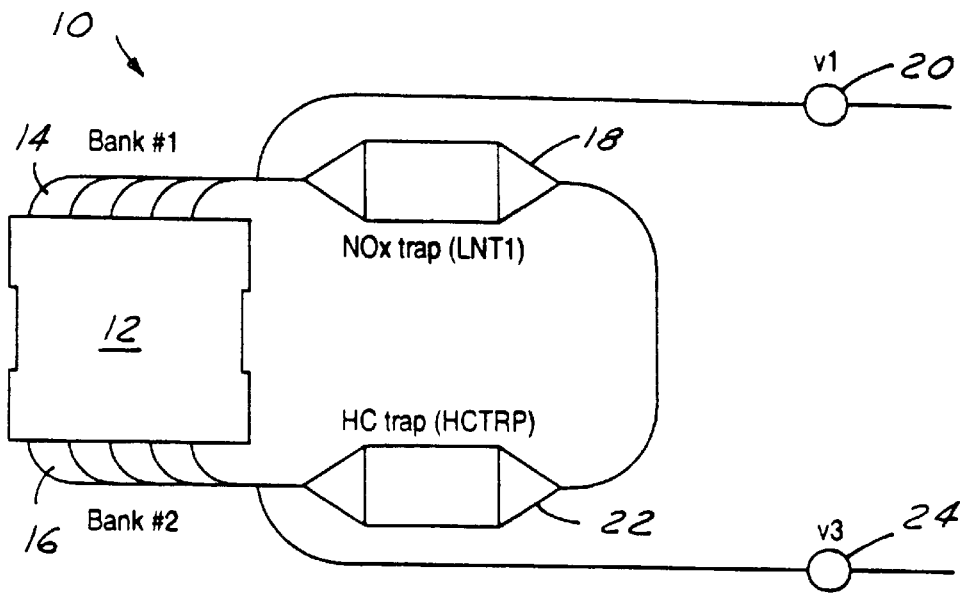
FIG. 1 is a schematic diagram of one embodiment of the aftertreatment system of the present invention.

Referring to FIG. 1 there is shown one embodiment 10 of a variable displacement engine 12 having two banks 14 and 16 of cylinders. A lean $NO_x$ trap 18 is located after the first bank 14 of cylinders. A control valve 20 controls the flow of exhaust through the $NO_x$ trap from the first bank 14 of cylinders.

A hydrocarbon (HC) trap 22 is located after the second bank 16 of cylinders. A control valve 24 controls the flow of exhaust through the HC trap 22 from the second bank 16 of cylinders.

At start up of the engine, the first bank 14 of cylinders is activated. The control valve 24 is opened and the control valve 20 is closed. Cold start hydrocarbons are then stored in the HC trap 22. Once the $NO_x$ trap 18 has reached "light-off" and becomes active, the first bank 14 of cylinders is deactivated and the second bank 16 is activated. At the same time, the control valve 20 is opened and the control valve 24 is closed. The hydrocarbons stored in the HC trap 22 are released and subsequently oxidized in the now active $NO_x$ trap 18.

When only one bank, 14 or 16, of cylinders is active at a time, it is beneficial to operate the engine in a lean burn mode to further improve fuel economy. In lean burn operation, the temperature of the $NO_x$ trap is important. The $NO_x$ trap 18 is operable within a certain a temperature range. Outside of that range, the efficiency of the trap 18 is greatly reduced.

As the engine 12 operation alternates between the first bank 14 and the second bank 16, the $NO_x$ trap 18 operates as a reverse flow reactor. In reverse flow reactor theory, a reversed flow converter uses periodical reversals of exhaust gas flow through a catalyst to exploit the catalyst's heat retention properties. It is known that the reverse flow converter retains a low temperature inside the catalyst bed during short-term temperature excursions.

In the present invention, the rate, or frequency, of switching between the two banks 14, 16 of the engine is used to control the operating temperature of the $NO_x$ trap 18, thereby maximizing $NO_x$ trapping efficiency. The hydrocarbon trap 22 ensures that hydrocarbons are not release before the catalyst in the $NO_x$ trap 18 becomes active.

Figure 2:
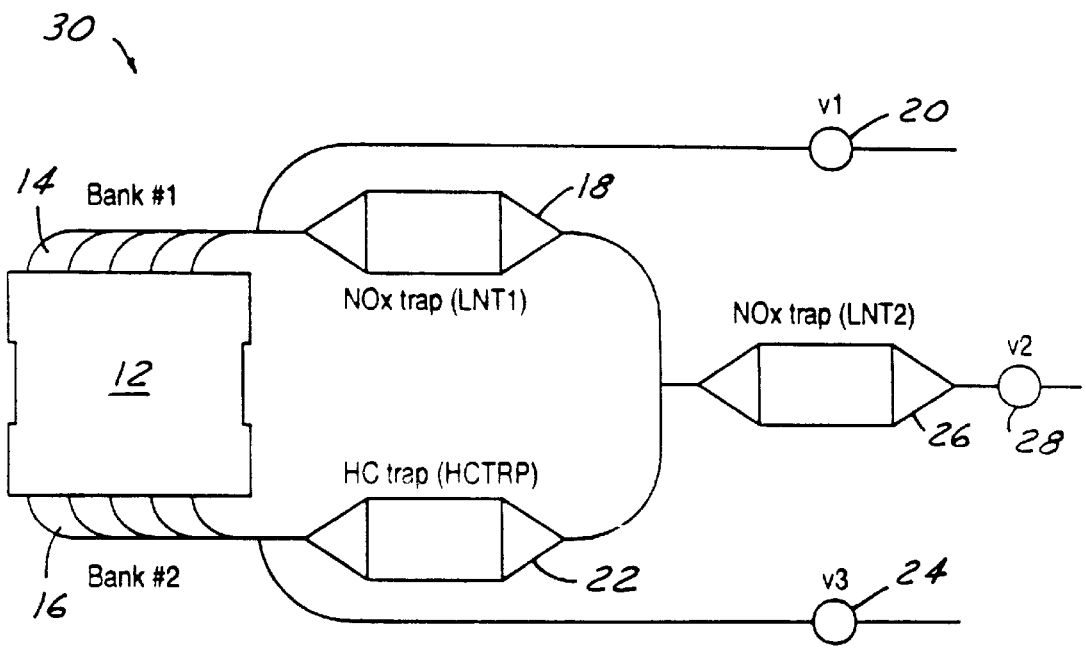
FIG. 2 is a schematic diagram of another embodiment of the aftertreatment system of the present invention including an additional $NO_x$ trap.

In some operating conditions, i.e. when greater output power from the engine 12 is required, both banks 14 and 16 are simultaneously activated and operated in either a lean burn or stoichiometric mode. Under these operating conditions, a second $NO_x$ trap is used. Referring now to FIG. 2, there is shown another embodiment 30 of the present invention including an additional $NO_x$ trap 26 and control valve 28.

During lean burn operation with both banks simultaneously activated, the location of the second $NO_x$ trap 26 is determined by the temperature operating window selected for maximizing the $NO_x$ trap efficiency. Very little $NO_x$ adsorption is likely to occur in the first $NO_x$ trap 18 due to the relatively high engine exhaust temperature. During lean burn or stoichiometric operating conditions, control valves 20 and 24 are closed and control valve 28 is open. The $NO_x$ traps 18 and 26 and the HC trap 22 simply function as normal three-way catalysts.

The method 100 of the present invention will be described herein with reference to the embodiment in which the second $NO_x$ trap is provided. It should be noted, however, that the second $NO_x$ trap 26 and control valve 28 are optional. Thus, in the following description, it is possible to eliminate both of these elements, without affecting the operation of the aftertreatment system according to the method of the present invention.

The method 100 at engine start up is described with reference to FIG. 3. At engine start up, the first bank of cylinders is activated 102. Control valve 24 is opened 104, and control valves 20 and 28 are closed 106. The hydrocarbons are stored 108 in the HC trap 22 until the first $NO_x$ trap 18 reaches "light-off". At this time, the first bank 14 is deactivated 110 and the second bank 16 is activated 112. The control valve 20 is opened 114 and control valve 24 is closed 116. Control valve 28 remains closed. The hydrocarbons stored in the HC trap 22 are released 118 and the first $NO_x$ trap 18 oxidizes them.

FIG. 4 is flow chart of the method 120 of the present invention as the engine operation alternates between banks 14, 16 in order to control the operating temperature of the first $NO_x$ trap. During a first lean burn mode, the temperature of the first $NO_x$ trap is measured 122. The temperature is monitored 124 as long as it remains within a desired range. When the temperature of the first $NO_x$ trap is outside of the desired range, the first bank 14 is activated 126, the second bank 16 is de-activated 128, valve 24 is opened 130 and valves 20 and 28 are closed 132. The temperature of the first $NO_x$ trap is measured 134 and monitored 136 until it is outside of the desired range, at which time, the banks are alternated. The first bank 14 is de-activated 138, the second bank 16 is activated 140, valve 20 is opened 142, and valves 24 and 28 are closed 144. The method will cycle between cylinders while the temperature is monitored to maintain the temperature of the first $NO_x$ trap within the desired operating temperature range.

According to the method 120 of the present invention, activation of the engine banks is alternated to control the temperature of the first $NO_x$ trap 18. A temperature sensor (not shown), or any other appropriate method, is used to determine when the engine banks will be activated and deactivated. The control valves 20, 24 and 28 will direct the flow of exhaust to maximize the $NO_x$ trap efficiency.

During periods when more engine power is needed, both engine banks run simultaneously. This embodiment of the method 150 is shown in FIG. 5. The first and second banks are both activated 152, valve 28 is opened 154 and valves 20 and 24 are closed 156. As discussed above, while both engine banks 14 and 16 are operating simultaneously, it is not possible to control the temperature of the first $NO_x$ trap 18 due to the high temperatures of the engine exhaust gas. The second $NO_x$ trap, which is necessary only if both engine banks will operate simultaneously, is positioned in the exhaust system such that its temperature window is optimized for the most efficient operation. In the case where only one engine bank is operating at a time, it is possible to eliminate the second $NO_x$ trap 26 and control valve 28 from the system.

It is to be understood that the present invention is not limited to the embodiments described herein. The invention covers all alternatives, modifications, and equivalents, as may be included within the spirit and scope of the appended claims.

What is claimed is:

1. An aftertreatment system for a variable displacement engine having first and second cylinder banks, said aftertreatment system comprising:

a first $NO_x$ trap in communication with said first cylinder bank;

a first valve for opening and closing a path between said first cylinder bank and said first $NO_x$ trap;

a hydrocarbon trap in communication with said second cylinder bank;

a second valve for opening and closing a path between said second cylinder bank and said hydrocarbon trap, whereby said first and second valves are operable to direct an emission flow between said first cylinder bank and said hydrocarbon trap and said second cylinder bank and said $NO_x$ trap.

2. The aftertreatment system as claimed in claim 1 further comprising:

a second $NO_x$ trap positioned between said first $NO_x$ trap and said hydrocarbon trap; and a third valve for controlling an emission flow through said second $NO_x$ trap.

3. A method for controlling the temperature of a first $NO_x$ trap in an aftertreatment system for a variable displacement engine having first and second cylinder banks, said method comprising the steps of:

activating said first bank of cylinders;

opening a path from said first bank of cylinders to a hydrocarbon trap;

closing a path from said first bank of cylinders to said first $NO_x$ trap;

storing hydrocarbons in said hydrocarbon trap until the temperature of said first $NO_x$ trap reaches a predetermined temperature;

deactivating said first bank of cylinders;

activating said second bank of cylinders;

opening a path from said second bank of cylinders to said first $NO_x$ trap;

closing a path from said second bank of cylinders to said hydrocarbon trap;

releasing said stored hydrocarbons from said hydrocarbon trap, whereby said first $NO_x$ trap operates as a reverse flow reactor and said hydrocarbons are oxidized by said first $NO_x$ trap.

4. The method as claimed in claim 3 further comprising the steps of:

monitoring the temperature of said first $NO_x$ trap until it is outside of a predetermined operating temperature range;

deactivating said second bank of cylinders;

activating said first bank of cylinders opening a path from said first bank of cylinder through said hydrocarbon trap;

closing a path from said first bank of cylinders through said first $NO_x$ trap;

monitoring the temperature of said first $NO_x$ trap until it is outside of said predetermined desired operating temperature range;

deactivating said first bank of cylinders;

activating said second bank of cylinders;

opening a path from said first bank of cylinders to said first $NO_x$ trap;

closing a path from said second bank of cylinders to said hydrocarbon trap;

whereby said temperature of said first $NO_x$ trap is monitored and said steps of activating and deactivating cylinder banks and opening and closing associated paths are alternated in order to maintain a desired operating temperature of said first $NO_x$ trap.

5. The method as claimed in claim 3 wherein said aftertreatment system further comprises a second $NO_x$ trap:

whereby when said first bank of cylinders is activated, said step of closing a path from said first bank of cylinders to said first $NO_x$ trap further comprises the step of closing a path from said second $NO_x$ trap; and whereby when said second bank of cylinders is activated, said step of closing a path from said second bank of cylinders to said hydrocarbon trap further comprises closing a path from said second $NO_x$ trap.

6. The method as claimed in claim 4 wherein said aftertreatment system further comprises a second $NO_x$ trap:

whereby when said first bank of cylinders is activated, said step of closing a path from said first bank of cylinders to said first $NO_x$ trap further comprises the step of closing a path from said second $NO_x$ trap; and whereby when said second bank of cylinders is activated, said step of closing a path from said second bank of cylinders to said hydrocarbon trap further comprises closing a path from said second $NO_x$ trap.

7. The method as claimed in claim 3 wherein said aftertreatment system further comprises a second $NO_x$ trap and said method further comprises the steps f:

activating said first and second cylinder banks simultaneously;

opening a path from said second $NO_x$ trap;

closing a path from said first bank of cylinders to said first $NO_x$ trap; and closing a path from said second bank of cylinders to said hydrocarbon trap.

* * * * *